United States Patent [19]

Lefrancois

[11] 4,204,309
[45] May 27, 1980

[54] PROCESS OF FABRICATING HOLLOW BEAD RINGS

[75] Inventor: Jean Lefrançois, Clermont-Ferrand, France

[73] Assignee: Compagnie Generale des Etablissements Michelin, Clermont-Ferrand, France

[21] Appl. No.: 904,294

[22] Filed: May 9, 1978

[30] Foreign Application Priority Data

May 13, 1977 [FR] France .................. 77 15008

[51] Int. Cl.$^2$ .......................................... B23P 17/00
[52] U.S. Cl. ...................... 29/412; 29/157.3 A; 29/156.8 H; 72/256; 72/264; 72/367; 152/362 R; 138/38; 138/115; 228/173 F
[58] Field of Search ............ 29/DIG. 47, 412, 417, 29/156.8 H, 455 LM, 157.3 A; 72/256, 264, 367, 370; 152/362 R; 138/38, 114, 103, 37, 115, 172; 228/173 E, 173 R, 173 F

[56] References Cited

U.S. PATENT DOCUMENTS

| | | | |
|---|---|---|---|
| 1,177,320 | 3/1916 | Grabowsky | 72/370 |
| 1,928,992 | 10/1933 | Clark et al. | 138/103 |
| 2,754,576 | 7/1956 | Foster | 228/173 R |
| 3,267,564 | 8/1966 | Keyes | 138/38 X |
| 3,662,582 | 5/1972 | French | 29/157.3 A X |

FOREIGN PATENT DOCUMENTS 2360731 12/1975 Fed. Rep. of Germany ...... 152/362 R

*Primary Examiner*—Charlie T. Moon
*Attorney, Agent, or Firm*—Brumbaugh, Graves, Donohue & Raymond

[57] ABSTRACT

Process of fabricating hollow bead rings for the beads of pneumatic tires, said hollow bead rings having a radial cross-section with at least one interior partition which connects together two portions of the outer contour, is improved by using the following operations:

(a) extruding, by means of an extruder whose orifice is equipped with a single mandrel, a hollow member whose interior partition is connected to a single one of said portions, the other end of the interior partition being free, and (b) deforming, in one or more steps, the radial cross-section of the hollow member until the free end of the interior partition comes into contact with the other portion of the outer contour.

11 Claims, 7 Drawing Figures

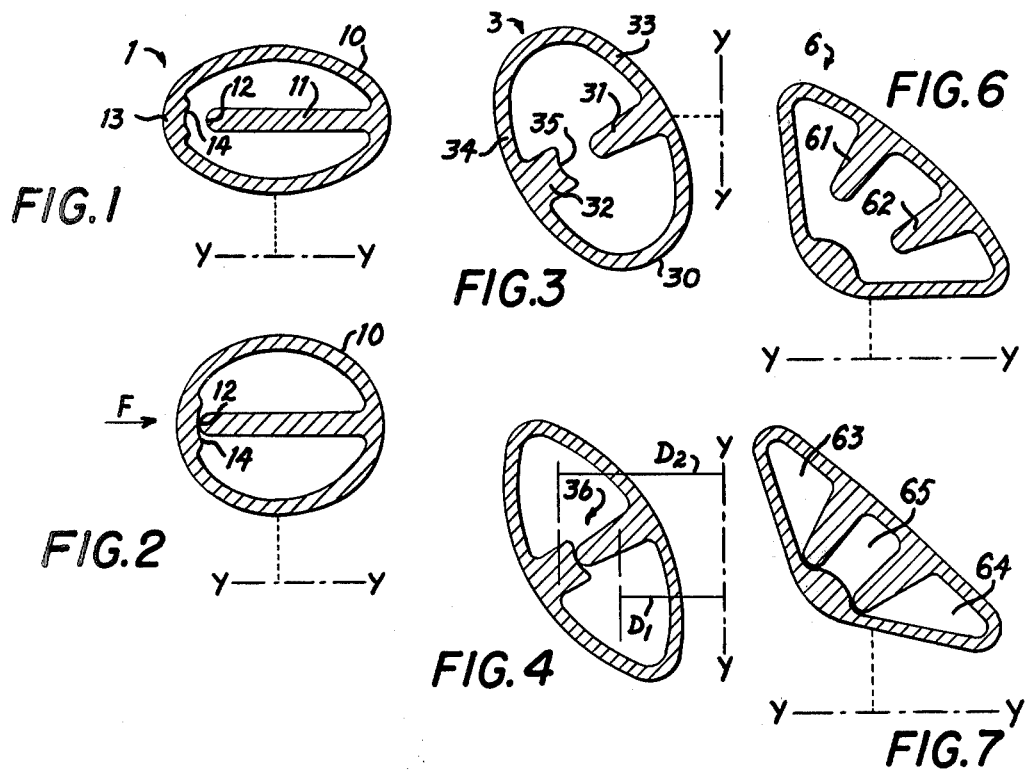
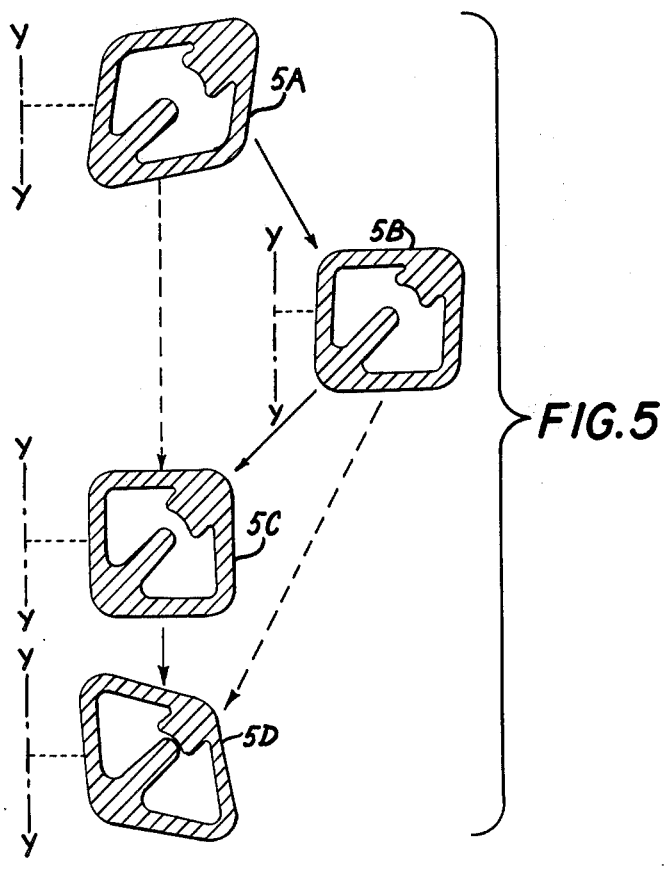

PROCESS OF FABRICATING HOLLOW BEAD RINGS

This invention relates to improvements in pneumatic tires and, more particularly, to processes of fabricating hollow bead rings intended to reinforce the beads of tires.

In the case of certain tires, and particularly those of the type having a radial carcass reinforcement, it is advisable to use bead rings whose radial cross-section is relatively large. It therefore appears of interest to use hollow bead rings. However, such hollow bead rings are incapable of withstanding large stresses when they consist solely of a peripheral wall without interior reinforcements which partition-off the radial cross-section of the hollow bead ring.

One method of obtaining hollow members suitable for the manufacture of such hollow bead rings consists in extruding a hollow metallic member and then transforming it so as to make hollow bead rings therefrom. However, in order to obtain continuous interior partitions it is necessary to provide several mandrels in the orifice of the extruder. Extrusion becomes difficult, if not impossible.

The hollow member obtained has, at times, manufacturing defects. Finally, the bending of such a hollow member gives rise to defects.

The object of the present invention is to overcome these drawbacks.

Thus the process of the invention for fabricating hollow bead rings for the beads of pneumatic tires, said hollow bead rings having a radial cross-section with at least one interior partition which connects together two portions of the outer contour, comprises the following operations:

(a) extruding, by means of an extruder whose orifice is equipped with a single mandrel, a hollow member whose interior partition is connected to a single one of said portions, the other end of the interior partition being free; and (b) deforming, in one or more steps, the radial cross-section of the hollow member until the free end of the interior partition comes into contact with the other portion of the outer contour. In this way, one obtains an interior partition which connects the two portions of the outer contour.

A variant of the extruding operation consists in making the interior partition in two parts during the extrusion, one part being integral with one of the portions of the outer contour and the other part being integral with the other portion of the outer contour to be connected to each other, each of the two parts of the interior partition being located approximately along the extension of each other.

The deforming operation consists in deforming the radial cross-section of the hollow member until the free ends of the two parts of the interior partition come into contact with each other.

The deforming operation may be effected at different stages of the fabricating process, said process further comprising additional operations, namely, cutting the hollow member into suitable length, bending the hollow member to the desired diameter and connecting the ends of the bent hollow member together, for example, by welding.

A first variant consists in effecting the deforming operation on the hollow member directly after the extruding operation. This variant and the following one are well-suited when the interior partition is approximately parallel, in the finished bead ring, to the axis of the bead ring (that is to say, to the axis of rotation of the tire). However, the deforming operation can also be effected on the hollow member after the bending operation or after the welding operation.

The second variant consists in carrying out the deforming operation in two steps, the first step being effected after the extruding operation and the second step being effected after the bending operation or after the welding operation. The second deforming step has the object of achieving the final development of the interior partition in accordance with the invention.

A third variant is well suited for interior partitions which, as seen in radial cross-section, form an angle with the axis of the bead ring. This third variant consists essentially in employing the bending operation in order to obtain all or at least a part of the deformation of the radial cross-section of the hollow member. However, this partial deformation can also be effected between a first partial deformation of the hollow member obtained from the extruding operation and a third and final partial deformation producing the final form of the interior partition before or after the welding operation. Another possibility consists in completing during the course of the bending operation the first partial deformation which has been applied to the hollow member obtained from the extruding operation.

The accompanying drawing, which refers to the following portion of the specification, is intended to illustrate a number of embodiments of the process of the invention.

In the drawing:

FIGS. 1 and 2 show radial cross-sections through a hollow bead ring in accordance with the invention having an interior partition parallel to the axis YY of rotation of the tire, before and after the deforming operation, respectively;

FIGS. 3 and 4 show radial cross-sections through another hollow bead ring of the invention having an interior partition which is inclined with respect to the axis YY of rotation of the tire, before and after the deforming operation, respectively;

FIG. 5 shows a radial cross-section through a third hollow bead ring in accordance with the invention, the deforming operation being effected in several steps; and FIGS. 6 and 7 show radial cross-sections, before and after the deforming operation, respectively, of a hollow bead ring in accordance with the invention which has two interior partitions.

In all the drawings, the axis YY symbolizes the axis of rotation of the tire (not shown), around which the extruded hollow member is bent to form a hollow bead ring.

In FIG. 1, the hollow member 1, for example, of steel, as it has come from the extruder, has a closed oval outer contour 10 which is elongated in the direction of the axis YY. In its interior, this hollow member 1 has an interior partition 11 with its base integral with the outer contour 10 and its free end 12 spaced from the wall of the outer contour 10. In that portion 13 of the outer contour 10 which is intended to come into contact with the free end 12, the outer contour 10 has a groove 14. After the deforming operation (FIG. 2), the free end 12 of the interior partition 11 is in contact with the groove 14. The latter is preferably provided in a slightly thicker section of the portion 13 of the outer contour 10.

In FIG. 2, which shows the hollow member 1 of FIG. 1 after the deforming operation is effected parallel to the interior partition 11 in the direction indicated by the arrow F, the outer contour 10' of the hollow member 1 has practically the shape of a circle in which the interior partition 11 occupies a diametrical position.

In FIG. 3, the hollow member 3 as it comes from the extruding operation has a part 31 of the interior partition which is integral with the portion 33 of the outer contour 30 and also has a part 32 of the interior partition which is integral with the portion 34 of the outer contour 30. One of the two parts of the interior partition (in this case the part 32) is preferably larger than the other part. This makes it possible to provide its free end with a groove 35 into which the free end of the other part 31 comes in contact during the deforming operation (FIG. 4), so as to form the interior partition 36. This interior partition 36 is inclined with respect to the axis YY of the tire (not shown) so that it is advisable to effect at least a partial deformation of the hollow member 3 during the bending operation, the separate parts 31 and 32 which face each other being arranged in such a manner that each is on a different mean diameter $D_1$ and $D_2$, respectively.

FIG. 5 shows another hollow member 5A in accordance with the invention as obtained by extrusion, then after having undergone a first partial deformation (5B), followed by a second partial deformation (5C), and finally a third and final deformation (5D). As a variant, it is possible to pass directly from stage 5A to stage 5C and then to stage 5D, or from stage 5B to stage 5D.

FIGS. 6 and 7 show the radial cross-section of a hollow bead ring in accordance with the invention provided with two interior partitions 61 and 62 which result from the connecting by deformation of the extruded hollow member 6 of FIG. 6. The partitions 61 and 62 form, together with the outer contour, two triangular cavities 63 and 64 located on opposite sides of a quadrilateral cavity 65.

Bead rings in accordance with the process of the invention may be made of any single or composite metallic or non-metallic material, provided that it is capable of being extruded, the deforming operation consisting of one or several steps being possibly carried out with the application of heat in the case of certain materials.

One advantage of the process of the invention resides in the use of a single mandrel arranged in the orifice or the extruder in order to obtain hollow members, such as those in FIGS. 1, 3, 5 and 6. Another advantage is that in many cases the deforming operation for the forming of the interior partition or partitions may be carried out simultaneously with the bending operation.

What is claimed is:

1. Process of fabricating a hollow bead ring for a bead of a pneumatic tire, said hollow bead ring having a radial cross-section with at least one interior partition which connects together two portions of the outer contour, characterized by the fact that it comprises the following operations:

(a) extruding, by means of an extruder whose orifice is equipped with a single mandrel, a hollow member whose interior partition is connected to a single one of said portions, the other end of the interior partition being free,
   (b) deforming, in one or more steps, the radial cross-section of the hollow member until the free end of the interior partition comes into contact with the other portion of the outer contour,
   (c) cutting the hollow member into suitable length,
   (d) bending the hollow member to the desired diameter, and
   (e) connecting the ends of the bent hollow member together by welding; said operations (c), (d) and (e) being performed either before or after said deforming operation (b).

2. Process according to claim 1, characterized by the fact that during the extruding operation a part of the interior partition is integral with one of the portions of the outer contour and the other part of the interior partition is integral with the other portion of the outer contour, the deforming of the radial cross-section of the hollow member bringing the free ends of the two parts of the interior partition into contact with each other.

3. Process according to claim 1 or 2, characterized by the fact that the deforming operation is effected on the hollow member directly after the extruding operation.

4. Process according to claim 1 or 2, characterized by the fact that the deforming operation is effected on the hollow member after the bending operation or after the welding operation.

5. Process according to claim 1 or 2, characterized by the fact that the deforming operation is effected in two steps, the first step being effected after the extruding operation and the second step being effected after the bending operation or after the welding operation.

6. Process according to claim 1 or 2, characterized by the fact that the entire deforming operation is effected during the bending operation.

7. Process according to claim 1 or 2, characterized by the fact that a partial deforming operation is effected during the bending operation.

8. Process according to claim 7, characterized by the fact that the partial deforming operation effected during the bending operation is a first partial deforming operation effected after the extruding operation.

9. Process according to claim 7, characterized by the fact that the partial deforming operation effected during the bending operation precedes a second partial deforming operation effected before or after the welding operation.

10. Process according to claim 7, characterized by the fact that the partial deforming operation effected during the bending operation follows a first partial deforming operation effected after the extruding operation and precedes a third partial deforming operation effected before or after the welding operation.

11. Process according to claim 1, characterized by the fact that the hollow bead ring consists of steel.

* * * * *